(12) United States Patent
Benson

(10) Patent No.: US 6,292,561 B1
(45) Date of Patent: Sep. 18, 2001

(54) DIGITAL MOBILE PHONE WITH A PLURALITY OF SWITCHABLE SUBSCRIBER IDENTIFICATION MODULES (SIMS)

(75) Inventor: Keith Benson, Parkside (AU)

(73) Assignee: Funge Systems Inc., Vienna, VA (US)

( * ) Notice: Subject to any disclaimer, the term of this patent is extended or adjusted under 35 U.S.C. 154(b) by 0 days.

(21) Appl. No.: 08/782,244

(22) Filed: Jan. 14, 1997

(30) Foreign Application Priority Data

Jan. 15, 1996 (AU) .................................................... PN7551

(51) Int. Cl.$^7$ ...................................................... H05K 1/14
(52) U.S. Cl. ............................................. 379/433; 379/428
(58) Field of Search ..................................... 379/433, 428, 379/434; 455/90, 575; 235/495

(56) References Cited

U.S. PATENT DOCUMENTS

| | | |
|---|---|---|
| 4,677,653 | 6/1987 | Weiner et al. . |
| 5,184,282 * | 2/1993 | Kaneda et al. ........................ 235/495 |
| 5,428,666 | 6/1995 | Fyfe et al. . |
| 5,586,166 | 12/1996 | Turban . |
| 5,815,426 | 9/1998 | Jigour et al. . |
| 5,884,168 | 3/1999 | Kolev et al. . |
| 5,894,597 | 4/1999 | Schwartz et al. . |

FOREIGN PATENT DOCUMENTS

| | | |
|---|---|---|
| 0 556 970 A1 | 8/1993 | (EP) . |
| 0 586 081 A1 | 3/1994 | (EP) . |
| 0 616 458 A1 | 9/1994 | (EP) . |
| 0 690 645 A1 | 1/1996 | (EP) . |
| WO 89/00370 | 12/1989 | (WO) . |
| WO 92/19078 | 10/1992 | (WO) . |
| WO 94/08433 | 4/1994 | (WO) . |
| WO 95/12293 | 5/1995 | (WO) . |
| WO 95/32590A | 11/1995 | (WO) . |

OTHER PUBLICATIONS

Brightman, "Connector design in portable products", Electronic Products design, May 1995, pp. 65–66.

T. Grigorova, et al., "Sim Cards", Telecommunication Journal of Australia, vol. 43 No. 2, 1993 pp. 33–38.

* cited by examiner

Primary Examiner—Jack Chiang
(74) Attorney, Agent, or Firm—Pillsbury Madison & Sutro LLP

(57) ABSTRACT

The invention is directed to a digital mobile phone of a type using a subscriber identification module, the improvement being that there is an externally attached holder for at least two subscriber identification modules so that either can be readily selected by a switch for use in the same phone. There are also described flexible circuits that are used to connect the electrical contacts used conventionally for reading a subscriber identification module by the phone inside the phone that are able to slip through gaps that are naturally occurring between protective covers of the phone because of necessary manufacturing tolerances so that the external subscriber identification modules can be connected without prejudicing manufacturers warranties on any phone.

13 Claims, 12 Drawing Sheets

DIGITAL MOBILE PHONE WITH A PLURALITY OF SWITCHABLE SUBSCRIBER IDENTIFICATION MODULES (SIMS)

BACKGROUND OF THE INVENTION

This invention relates to digital mobile phones.

It is conventional in a digital mobile phone that there is a removable subscriber identification module in the form of a card which is fitted into an internal holder.

Such a module which shall hereinafter be referred to as a "subscriber identification module card" is a user replacement module for use by a commercial entity providing a network to ensure that the digital phone is connected to the commercial entities network.

It is possible for a user to have the subscriber identification module card of one commercial network provider as well as the subscriber identification module card of its competitor.

However, in phones currently available, the card is not readily accessible for removal and replacement with an alternate subscriber identification module card.

It can be achieved but, taking at least one instance, for instance, the currently available Nokia 2110 digital phone, to replace the subscriber identification module card of one network and replace it with another, the battery has to be removed, a first external cover has to be pulled out, and an interlocking bracket must be operated to release the locking position of a pivotal support which is pushed into the release position. It is then still a matter of manipulation to be able to remove the subscriber identification module card from the holder.

The actions required mean that the phone has to be turned off so that if one wants to change networks, one then has to go through the additional procedures of closing the phone down, and then starting the phone up again.

At the present time, digital networks are not co-extensive and further, the costs of accessing or using one network as compared to another vary considerably so that there is considerable advantage to an end user to be able to choose the network, a) upon being within the range of a particular network or being in a position to better be able to receive a particular signal, and b) alternatively that the price of a call from one network may be quite different to the price of another.

It is currently possible with the same phone to do this but with the effort involved in having to change over subscriber identification module cards, most people will either not consider doing so or will not be bothered in most cases.

The disadvantage of this is that one network provider which wishes to actively compete with other network providers, might then be at a considerable disadvantage because despite providing best prices, their network might not be quite as extensive and they therefore cannot persuade a phone user to use their network because the decision is made on the basis of both access and cost.

What I propose is a solution to this problem which will have particular value to a commercial network provider especially if they do not have such an extensive range and it will provide substantial advantages to users because it will enable them to make a better choice without as many of the current implicit difficulties.

SUMMARY OF THE INVENTION

According to one form of this invention there is provided a mobile phone of the type having a subscriber identification module wherein there are provided at least two subscriber identification modules and switch means accessible to the user and adapted for the user to select one or other of the modules.

In preference there is proposed that there is an external holder attachable to an existing mobile digital phone and adapted to take at least two subscriber identification module cards, switch means to provide access to any one of the subscriber identification module cards held in the external holder and means connecting such connected external subscriber identification module card electrically to a subscriber identification module take-off adaptor adapted to be located within an existing internal subscriber identification module card holder of the digital mobile phone.

In a further form the invention can be said to reside in a digital mobile phone of a type having a user removable subscriber identification module card within an internal holder, characterised in that there is within the internal subscriber identification module card holder a take-off card having electrical contacts replicating any subscriber identification module card that would otherwise be therein, and connecting to electrical connections for electrical connection in the phone and having a wire take-off for each subscriber identification module connection, the wire take-off in each case extending to an outside of the body of the mobile phone to an external subscriber identification module card holder, the external subscriber identification module card holder being adapted to hold at least two subscriber identification module cards each having its electrical connections connected to the corresponding wire take-offs connected to the take-off card, and having a switch therewith adapted to change effective active connection from one of the subscriber identification module cards in the external card holder to a second of the subscriber identification module cards in the external card holder.

In another form of this invention this can be said to reside in a digital mobile phone of a type having a user removable subscriber identification module card within an internal subscriber identification module card holder, a take off card having a wire take-off for each subscriber identification module connection within the holder the wire take-off adapted to extend through to an outside of the body of the mobile phone to an external subscriber identification module card holder attached to the phone casing, the external subscriber identification module card holder being adapted to hold at least two subscriber identification module cards with each having its electrical connections connected to the corresponding wire take offs connected to the wire take-off, and having a switch therewith to change effective active connection of the wire take offs from a first of any subscriber identification module cards in the external card holder to a second or other of any subscriber identification module cards in the external card holder.

One of the difficulties with such an arrangement, however, is the question of how one provides such electrical connections from the internal parts of the phone to an external subscriber identification module card holder.

I have carefully examined each of the mobile digital phones currently on the market and I have found that in each case, it is possible to provide a connection using very thin wires in some cases of less than 0.3 mm thickness by having the thin wires follow a path beneath the covers and around corners to the external subscriber identification module cardholder.

In preference the external subscriber identification module card holder will be adhered in an appropriate way to the body of an existing digital phone and the switch would in preference be a mechanical switch.

Further, in preference, within the external card holder, there can be additionally provided electronically accessible memory and programmed software in the memory to provide additional functions as far as the digital mobile phone is concerned.

For instance, it is proposed in preference that such logic would examine through its connections with the digital phone, the best accessible network connection to be used, and also the best from a point of view of cost.

In such a case, there can be the additional feature of an electronics switch operated by the logic so that the user of the phone no longer has to make a decision as to which network to choose but this will be made on the basis of either cost or best signal as the case might be which can be previously selected for the logic to choose.

Further, there can in fact be additional memory to have additional recording of audio signals and any number of additional features can then be incorporated within or connected to the external module to be joined with the functions of the digital phone.

Further in preference there is provided that the wire take-offs are together an integrated flexible circuit board where there is a substrate, a laid conducting track for each circuit on the substrate and an overlay coating.

In preference the substrate is comprised of polyester plastics material.

In preference the conducting tracks are copper with gold contact surfaces.

What now will be seen to be the case in preference is that there is a digital mobile phone of a type using a subscriber identification module, the improvement being that there is an externally attached holder for at least two subscriber identification modules so that either can be readily selected by a switch for use in the same phone.

Further in preference there are flexible circuits that can be used to connect electrical contacts used conventionally for reading a subscriber identification module by the phone inside the phone that are able to slip through gaps that are naturally occurring between protective covers of the phone because of necessary manufacturing tolerances so that the external subscriber identification modules can be connected without prejudicing manufacturers warranties on any phone.

BRIEF DESCRIPTION OF DRAWINGS

For a better understanding of this invention it will now be described by reference to preferred embodiments which will be described with the assistance of drawings wherein.

DETAILED DESCRIPTION OF THE PREFERRED EMBODIMENT

Now referring in detail to the drawings, and in particular to FIGS. 1, 2, 3 and 4, the phone in this case 1 is a typical of a currently manufactured digital phone having control buttons on its front at 2, microphone at 3, sound output at 4 and a visual display at 5.

At the back of this phone, there are provided means to hold a Subscriber Identification Module which uniquely identifies a subscriber to a provider of a digital communications service.

Figure 2:
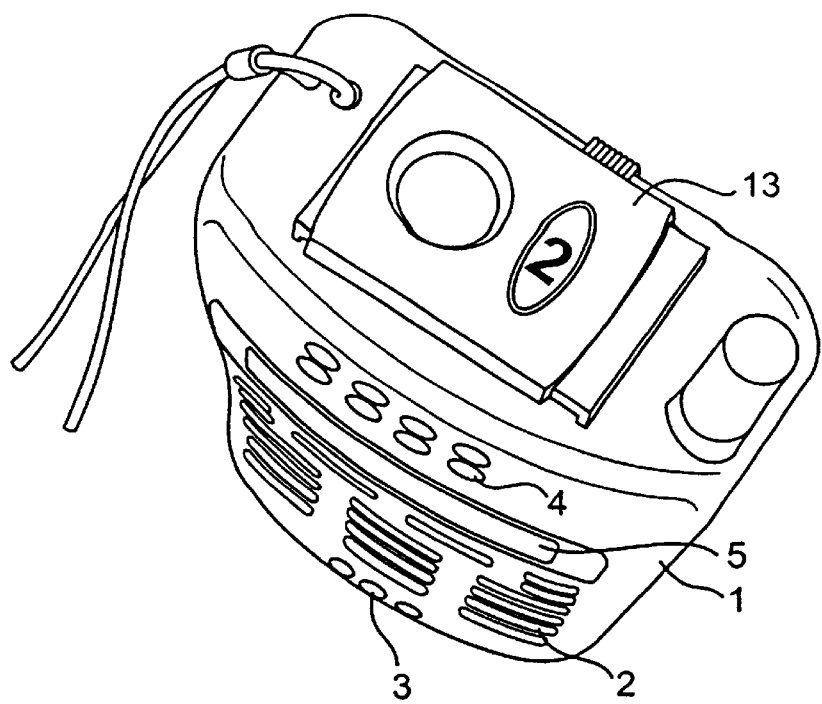
FIG. 2 is a perspective view of the top of the phone as shown in FIG. 1
Figure 1:
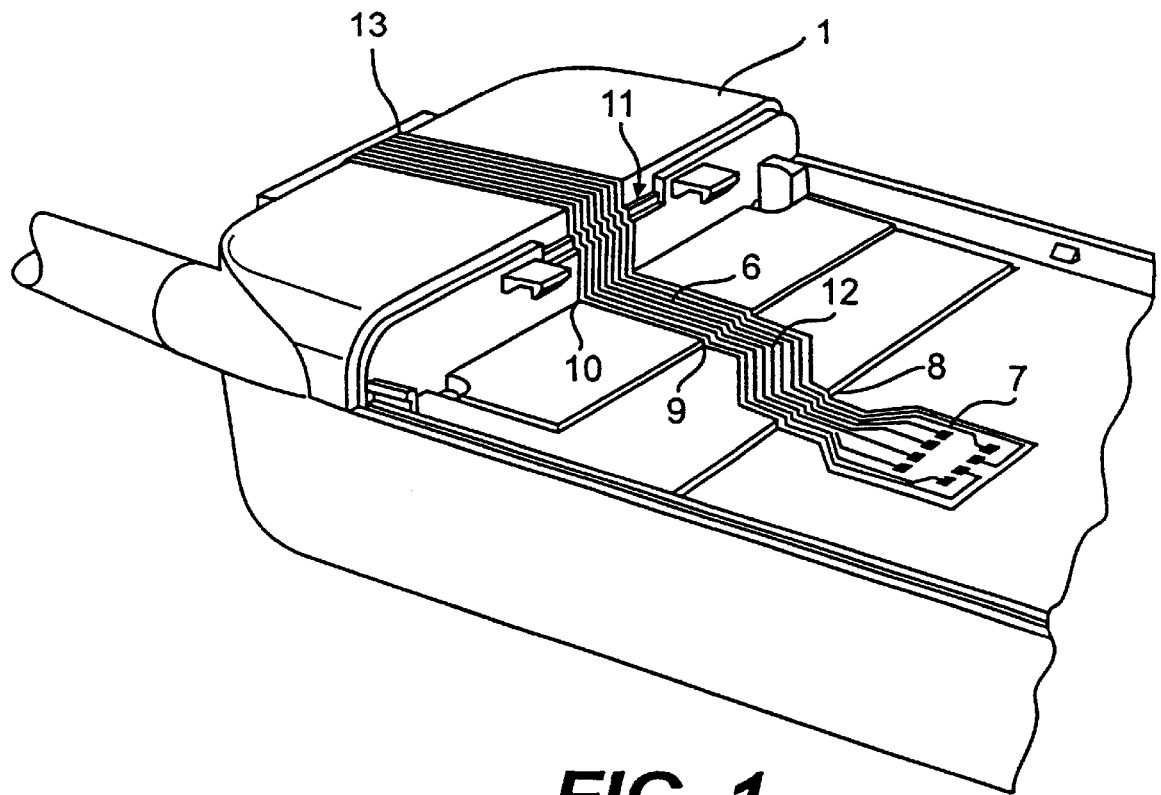
FIG. 1 is a perspective view of a digital phone according to a first embodiment where the illustration shows a phone with battery and SIM card holder removed and showing a conducting track shaped to follow a path to a switch at the top of the phone.
Figure 3:
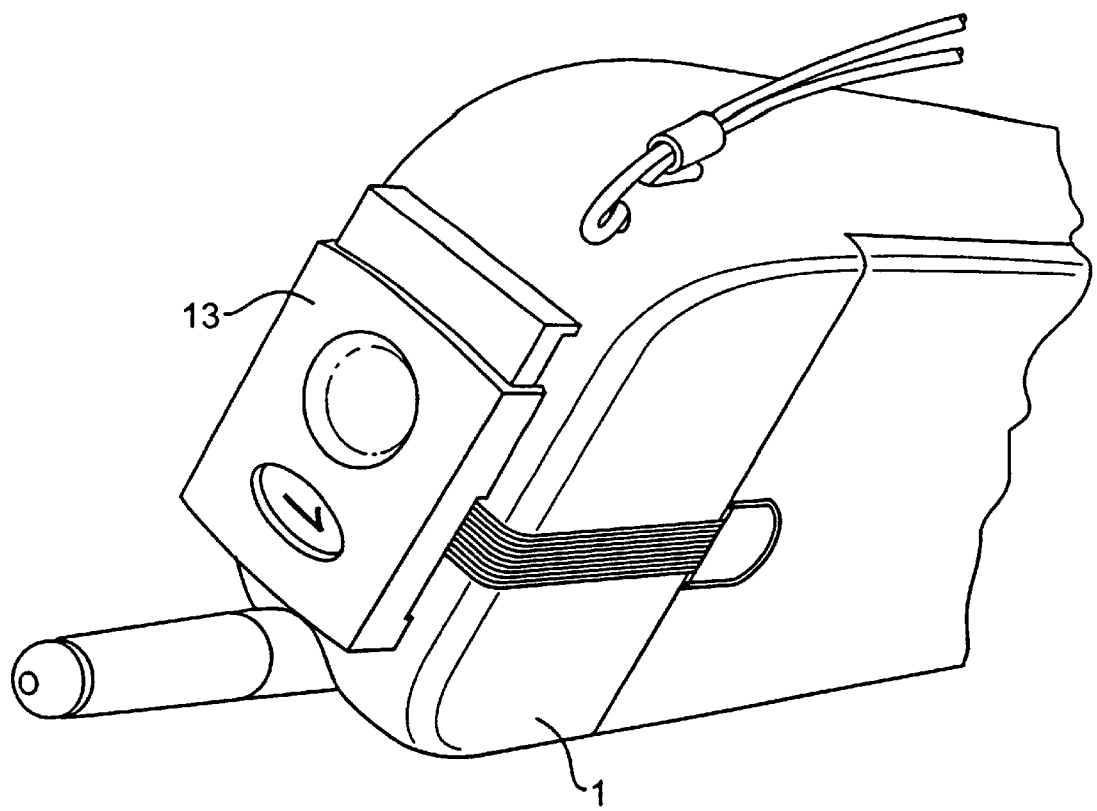
FIG. 3 is a further perspective view as shown in FIGS. 1 and 2 from a top of the phone, however, with the switch changed in position from a first position to a second position, and with a battery in position.
Figure 4:
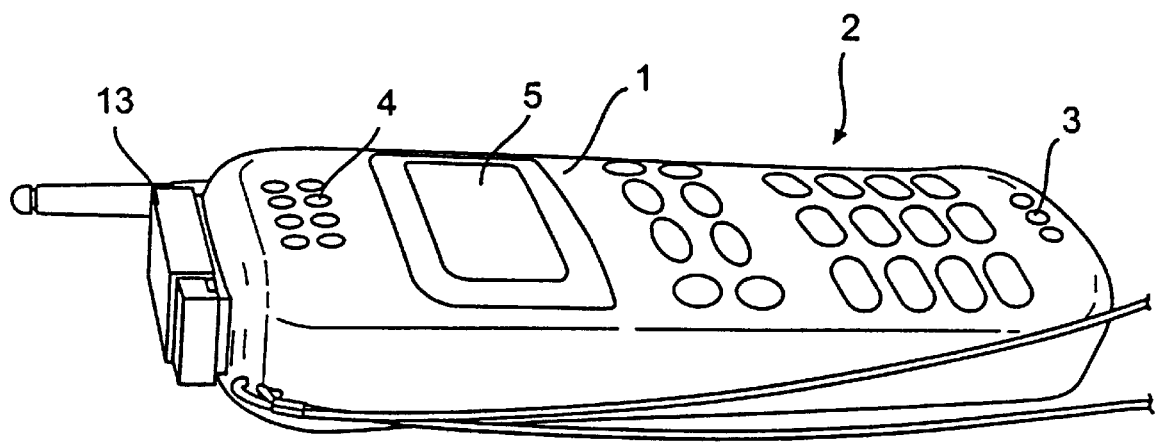
FIG. 4 is the same phone as in FIGS. 1, 2 and 3 and illustrates a further view of this according to the first embodiment.

In this case, with battery removed as particularly shown in FIG. 1, a flexible track 6 is formed initially in a planar shape and is assembled so as to have a polyester substrate, a track deposited into an etched channel within the polyester substrate to provide for conduction along the track, and a coating over this again of a polyester plastics material.

This is chosen so that the material itself will firstly be sufficiently flexible to be able to be subsequently shaped so as to follow very closely a somewhat tortuous path that will be necessary to convey electrical wire connections from a take off card 7 the connections of which then pass appropriately around corners such as at 8, 9, 10 and 11, firstly so that they can be firmly held in position by adhering to the surface of the material over which they pass and then secondly so that they are sufficiently thin so as not to interfere with interconnecting components that will otherwise have to be relocated in position.

The track also diverts from one linear direction through a diagonal orientation to another lineal direction at 12.

Finally the track connects into switch 13.

The switch 13 includes means to hold two Subscriber Identification Modules. By reason of a change in position of the switch 13 from in this case (1) to (2) the effective active electrical connections connected by reason of the take off card 7 will therefore be effectively changed. It will now be seen that by the attachment to the phone 1 of such an electrically conducting track this allows for the user to choose at least one of either of two Subscriber Identification Modules by the simplest of actions. Such an action will not of itself also require the phone to be switched off and the user can therefore quickly check whether there is service to be provided by one or other of the providers for which the SIM cards are in place.

Further, by reason that the electrical track is of a total thickness of approximately six thousandths of an inch, (this may be within the range of four thousands of an inch to eight thousandths of an inch,) this will not of itself in any cases so far established interfere with any of mechanically interlocking parts that will subsequently have to be reconnected such as a cover plate or a battery connection in an existing mobile phone.

I will now refer to a remainder of telephones and to examples of shapes of track which will be effective, but in general, it will now be seen that it appears that any commercially available digital phone using a Subscriber Identification Module can be appropriately modified to have this additional advantageous feature.

Figure 5:
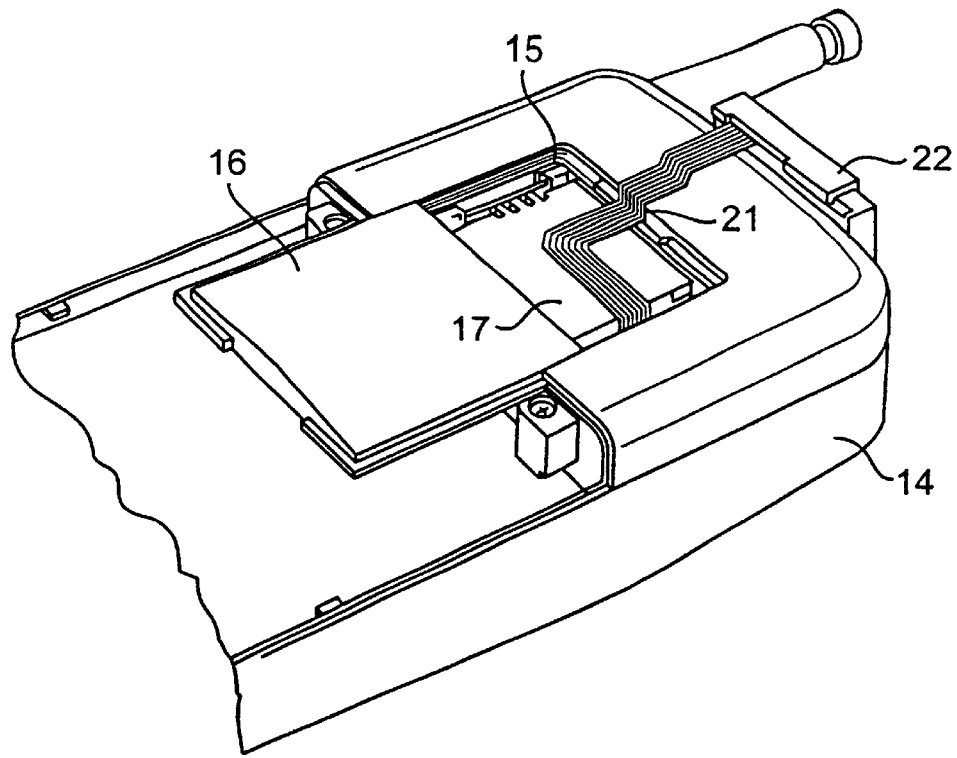
FIG. 5 is a view of a second phone according to a second embodiment where the illustration shows a perspective view with a Subscriber Identification Module (SIM card) cover in an open position and battery removed, and a track from a take off card replacing a Subscriber Identification Module.
Figure 6:
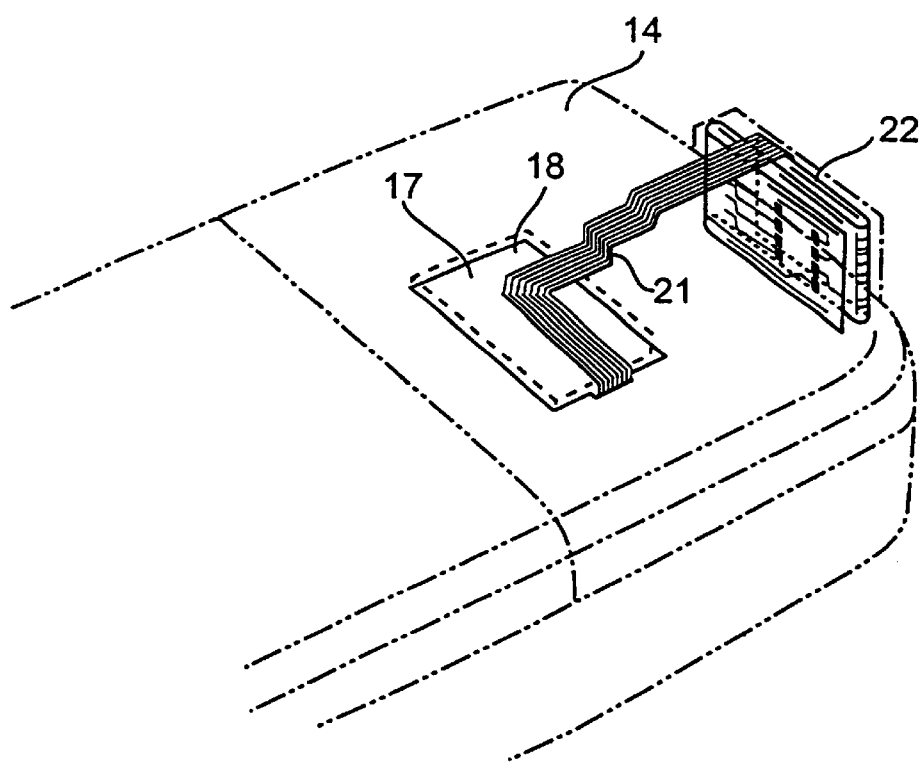
FIG. 6 is a view of the same phone from the same position as shown in FIG. 5 except a wire take off is shown in full with the shape of the phone in dotted outline.
Figure 7:
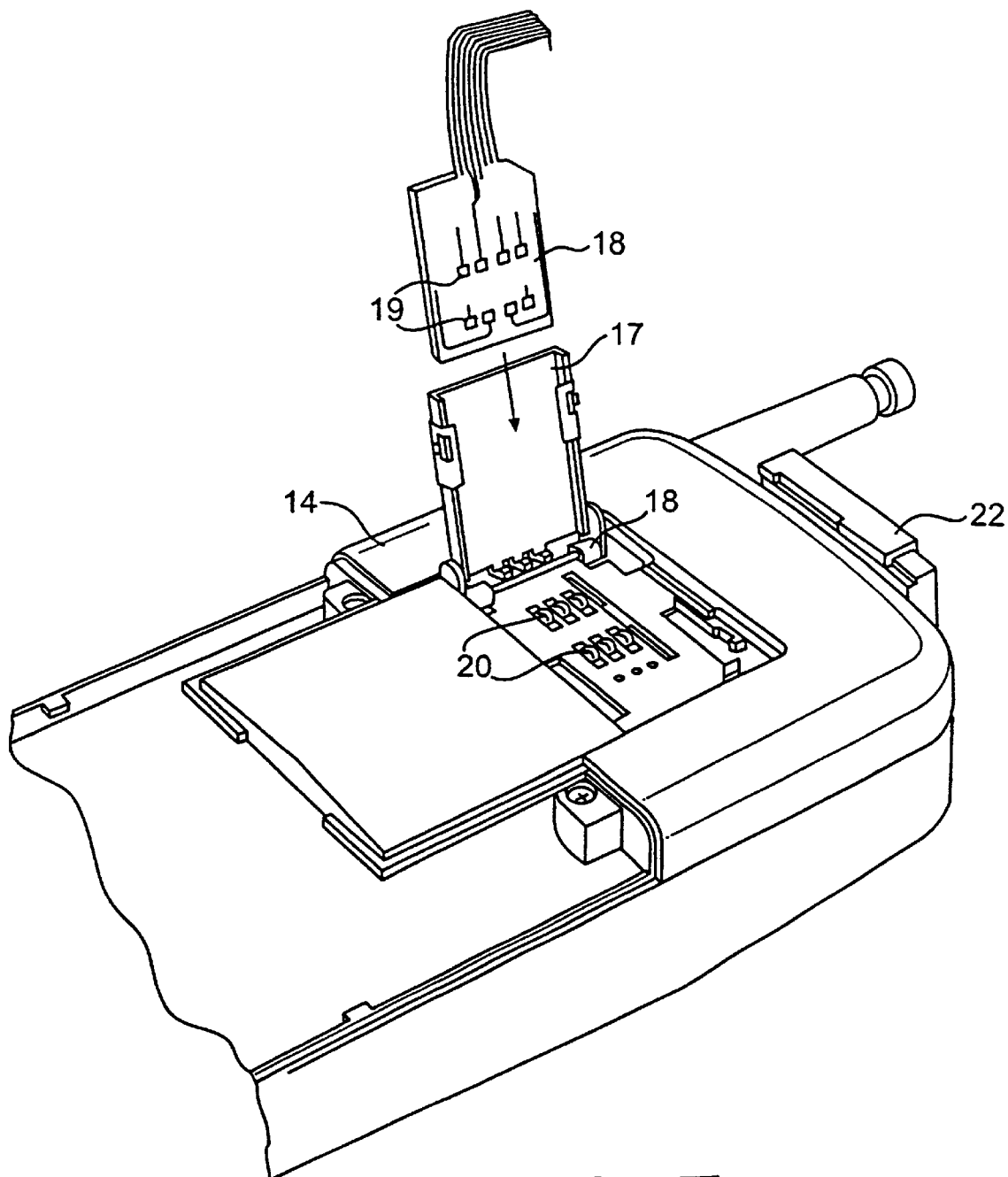
FIG. 7 is a view of the same phone as in FIGS. 5 and 6 with however a SIM card holder in an opened position about to take a take off card replacing a SIM card preparatory to locating the wire take off in the path to an external switch attached to the phone.

For instance, let us look at the embodiment illustrated in FIGS. 5, 6 and 7. In this case the phone 14 is of a type which has a separate compartment for the SIM card which can only be opened subsequent to a battery being removed.

Accordingly, the compartment shown at 15 is accessible by opening a sliding cover 16 which in FIG. 5 for instance and in FIG. 7 is shown in the open position.

A Subscriber Identification Module is intended to be held in a holder at 17 which of itself is pivotally supported at 18.

As shown then, according to this embodiment, a take off card at 18 is inserted in the SIM holder 17 and such then that the electrical contacts at typically 19 will engage against the appropriate electrical connectors of the phone at 20.

The thin track, again of a thickness of approximately six thousandths of an inch, and comprised of two layers of polyester plastics material, is carefully shaped to then be positioned on the back of the holder 17 and then tracked out from the compartment across an edge at 21 to a switch at 22.

Again in this case then there is able to be connected the SIM card take off electrical connections to separate and therefore easily accessible switch means at 22.

The track in this case is also adhered to an external surface of a body of the phone to keep this in a protected position.

Figure 8:
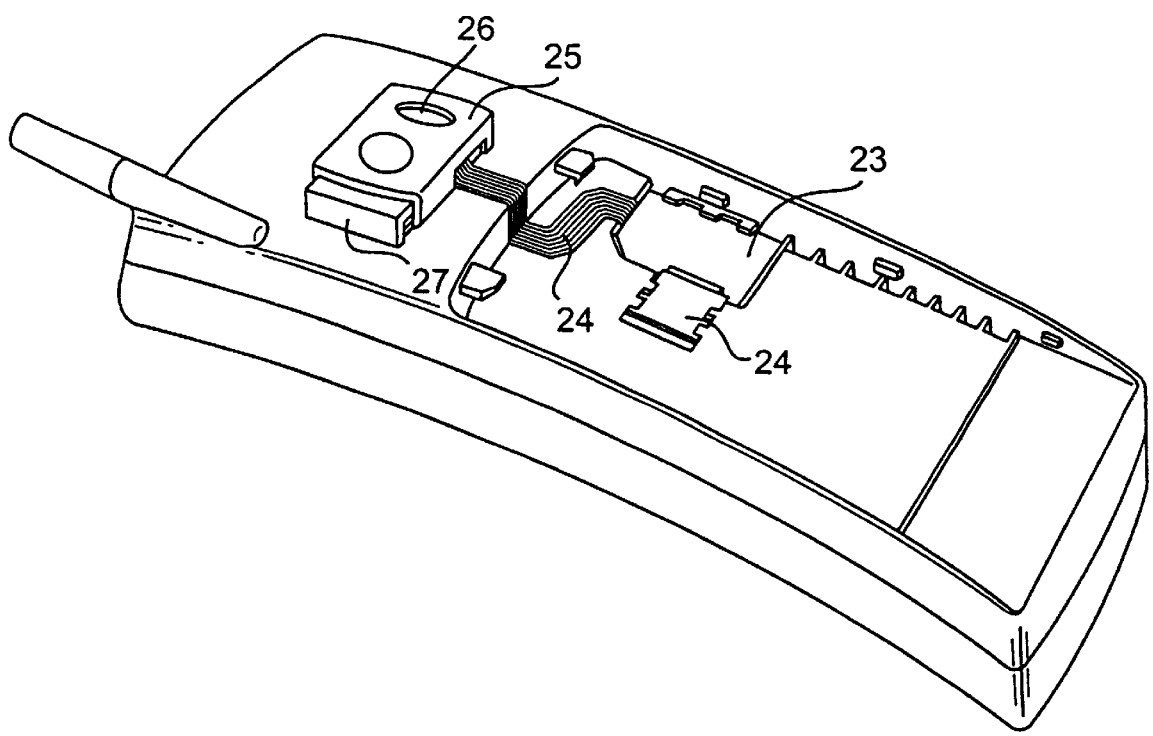
FIG. 8 is a perspective view of a phone according to a third embodiment wherein this case, the battery is removed to assist in seeing the features, and a switch is attached to the back of the phone connecting to the Subscriber Identification Module in this case.

Now referring to the drawing at FIG. 8, this is a third embodiment and is the illustration of a most recent model of digital phone with in this case a battery being removed but as can be seen, there is an electrical take off card at 23 which is held in position by a slideable catch at 24 and in this case then electrical connections are run through a pathway as shown at 24 which then track around outer surfaces of the body until they meet the switch at 25 which has a visual window at 26 to indicate which one of two SIM cards has been chosen. There is an end switch member at 27 by which switching is achieved.

In this case also, the track 24 is adhered to the surface of the phone and by reason of its thinness and its material structure such that its substrate and cover is of polyester plastic materials, it is able to follow closely corners of the track with very small radius without fracture. The track is adhered to the surface of the phone casing to assist in long term stability and mechanical support. In this case, there is also provided an over cover protective coating also adhered across the track and to the casing at both sides of the track.

Figure 9:
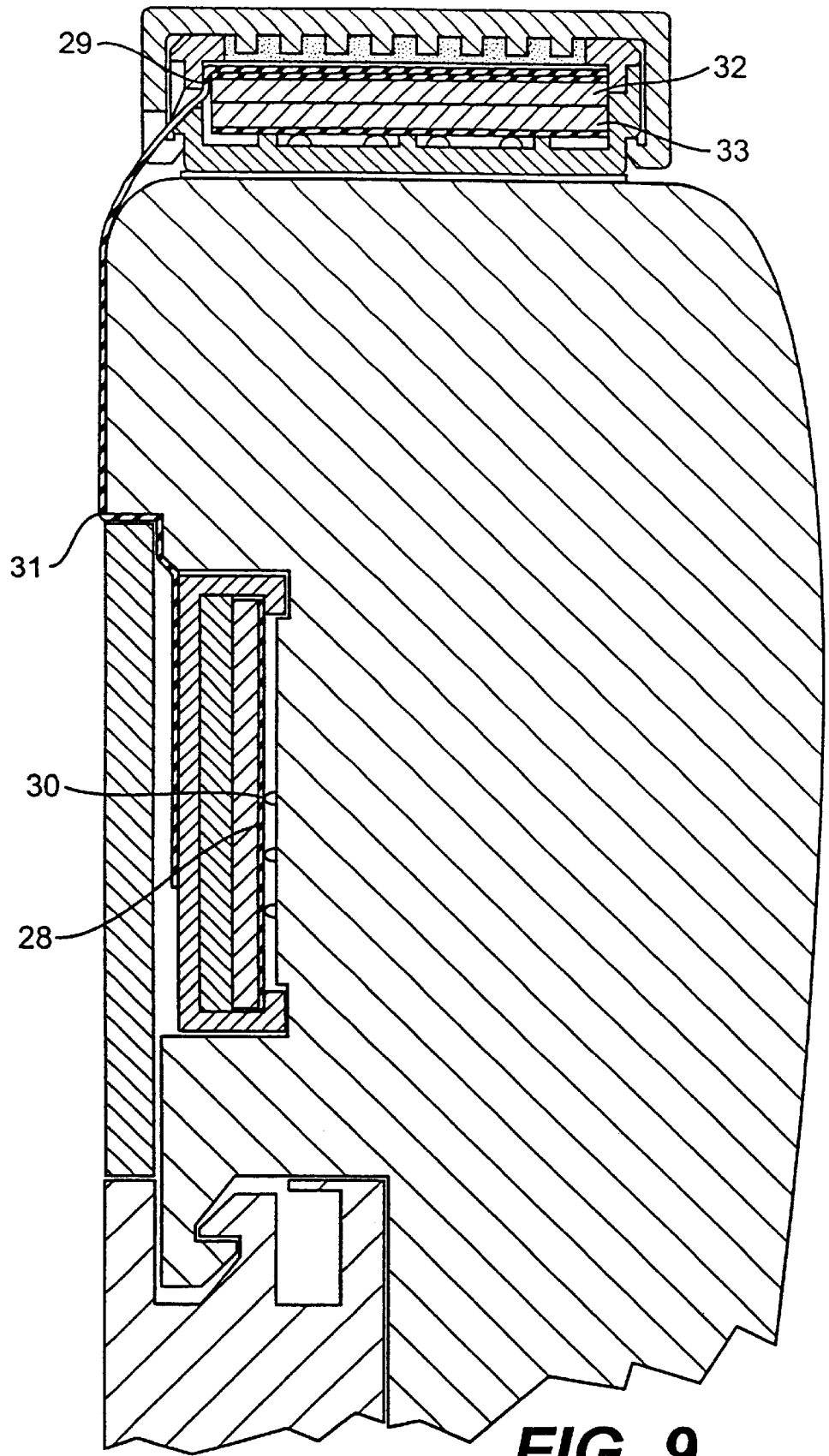
FIG. 9 is a cross sectional view according to a fourth embodiment the internal parts of the phone being shown schematically as simply cross hatched where of course there are functional electronic components within the phone which are of not direct relevance to the invention, the illustration showing the path of a flexible track in this case.

FIG. 9 shows somewhat schematically the way in which the electrical track is located to extend between take off card at 28 and switch at 29.

The card 28 is held so that its conducting face will electrically connect with connectors such as (30 and then the track of the conducting layers will then follow as shown at 31 for instance until it reaches the switch means 29 where the track itself is folded into a circuitous shape so that respective Subscriber Identification Modules shown at 32 in the one case and (33 in the other will in each case have their oppositely directed electronic parts accessible for electrical connection to the track.

Figure 10:
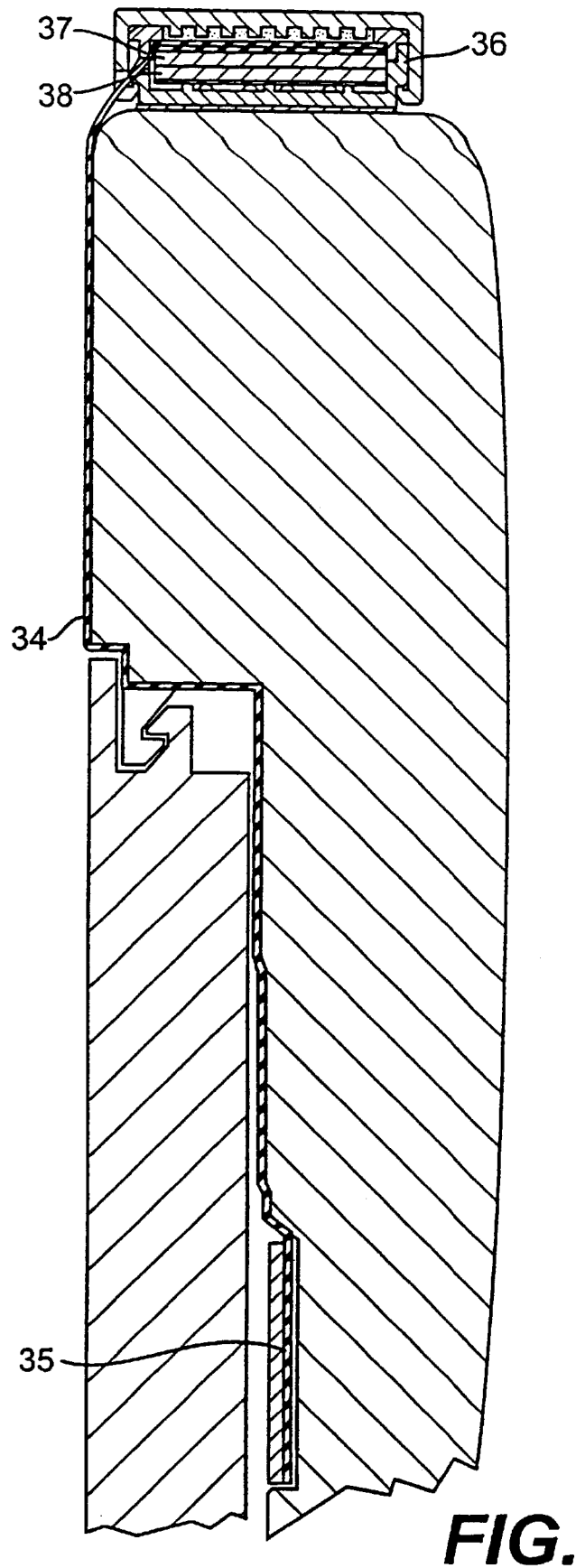
FIG. 10 is a cross sectional view similar to FIG. 9 of a further phone wherein this case the battery is also shown connected but wherein the internal details of the battery are shown simply as cross hatched for sake of simplicity.

This is shown in a further instance in FIG. 10 where the track 34 passes from a take off at 35 to switch means at 36 with two Subscriber Identification Modules at 37 and 38 being adapted to be in electrical contact with their effective active connections.

Figure 11:
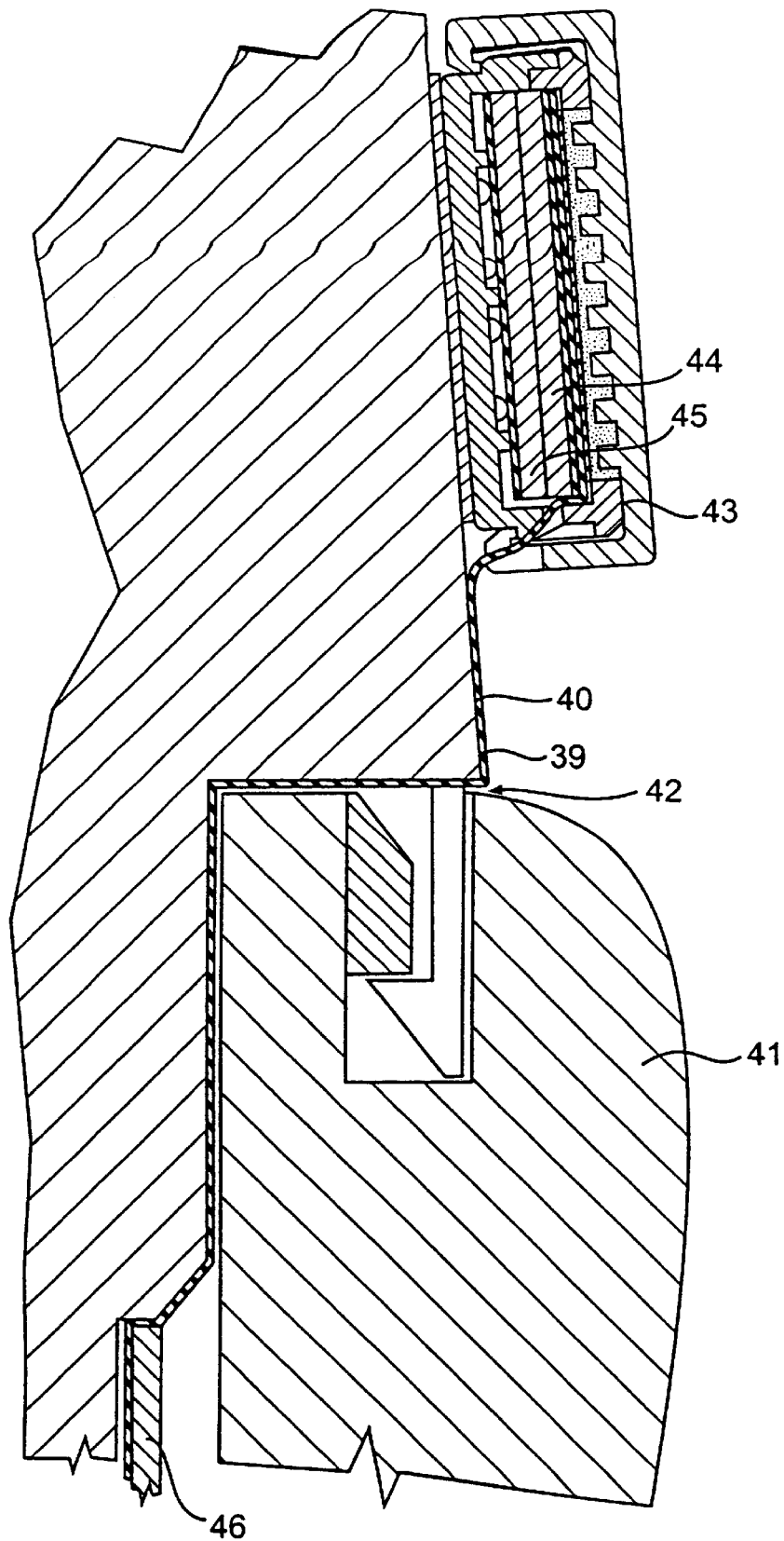
FIG. 11 is a cross sectional view in schematic form of the embodiment generally shown in FIG. 8.

A further example of this is in FIG. 11 where again track 39 is shown to very closely follow an external shape of the phone body at 40 noting that the general cross hatching is schematic only. In this case again, battery at 41 then can be shown to leave quite clear at 42 any contact or need to squeeze the track 39.

The track in this case again is of six thousandth of an inch total thickness and the tolerance or clearance between the respective mating members such as the battery. The housing will allow for an even larger thickness therebetween before there is interference with any effective action of the battery being relocated or being placed in position.

There is a switch, in this case again at 43 with the Subscriber Identification Modules at 44 and 45. There is a take off at 46.

Figure 12:
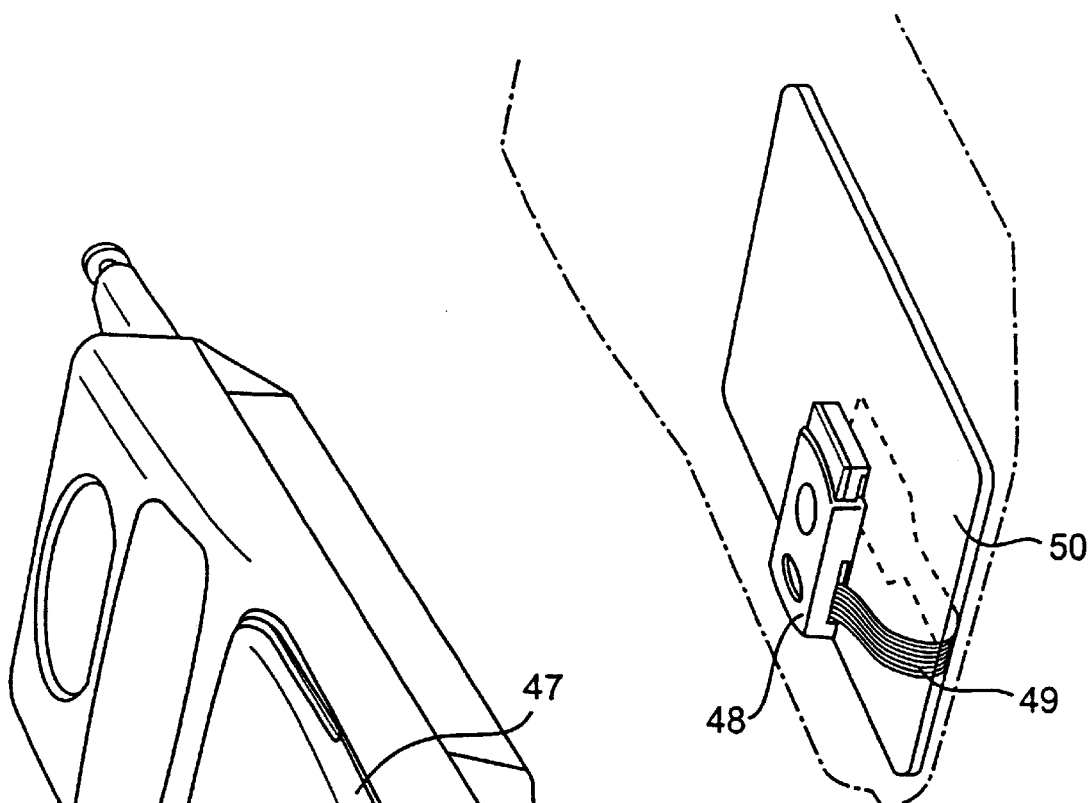
FIG. 12 is a perspective view of a further embodiment where the switch in this case is shown being connected to a flip lid on a phone and the track in this case is connecting through a flexible connection.
Figure 13:
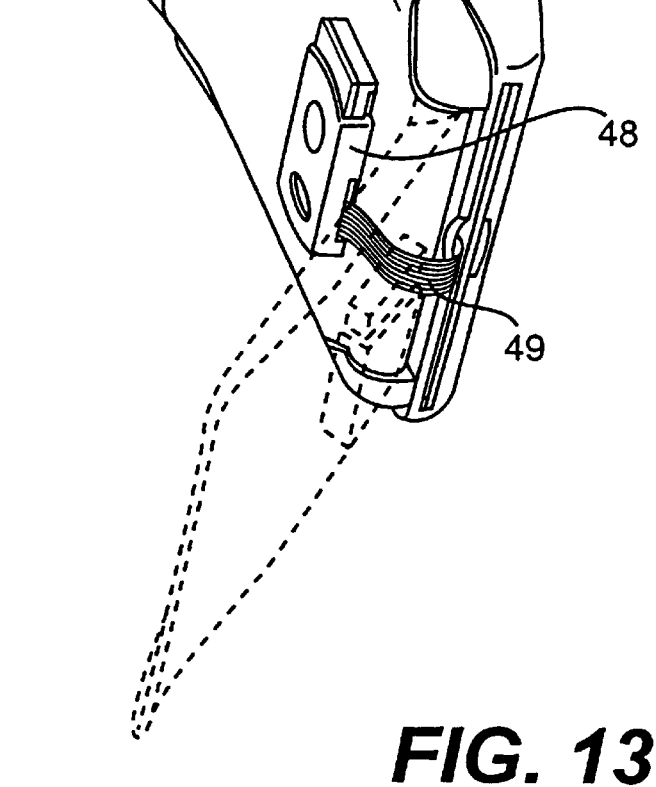
FIG. 13 is a further view of the same phone as in FIG. 12.

Referring now to FIGS. 12 and 13, the difference here is that this is an embodiment applying to a so called "flip phone".

In this case, there is a cover shown at 47 which can be opened to reveal a keypad and also to provide a microphone position.

In this case however, a switch means at 48 can be located on the outer surface of the cover 47 and a flexible track at 49 can be allowed to stay clear of being adhered throughout to the cover 47. This allows for a hinging flexible action of the flexible track with a larger radius so that the track which is only six thousandth of an inch thickness can more readily allow for repeated hinging, without undo metal fatigue of the track materials.

Not shown is a connection of the track to an appropriate internal Subscriber Identification Module provided by the manufacturer.

FIG. 12 illustrates the fact that in this case, the Subscriber Identification Module is of a larger size such as the size of traditional credit card shown at 50 but here again it works in the same way as those applications previously described.

Figure 14:
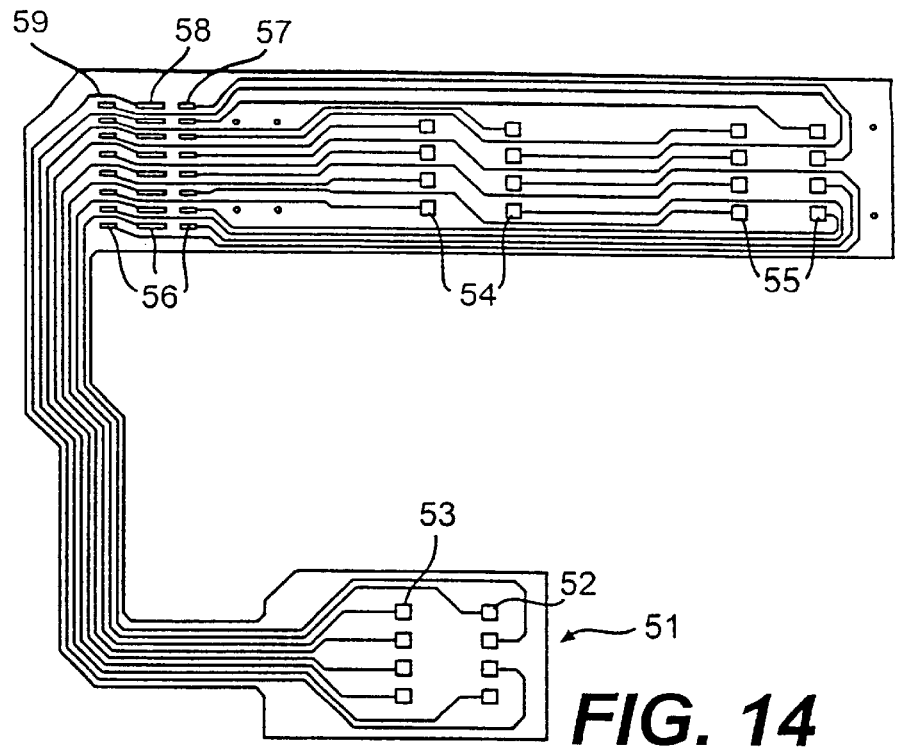
FIG. 14 is a plan view of a flexible track according to a typical layout.
Figure 15:
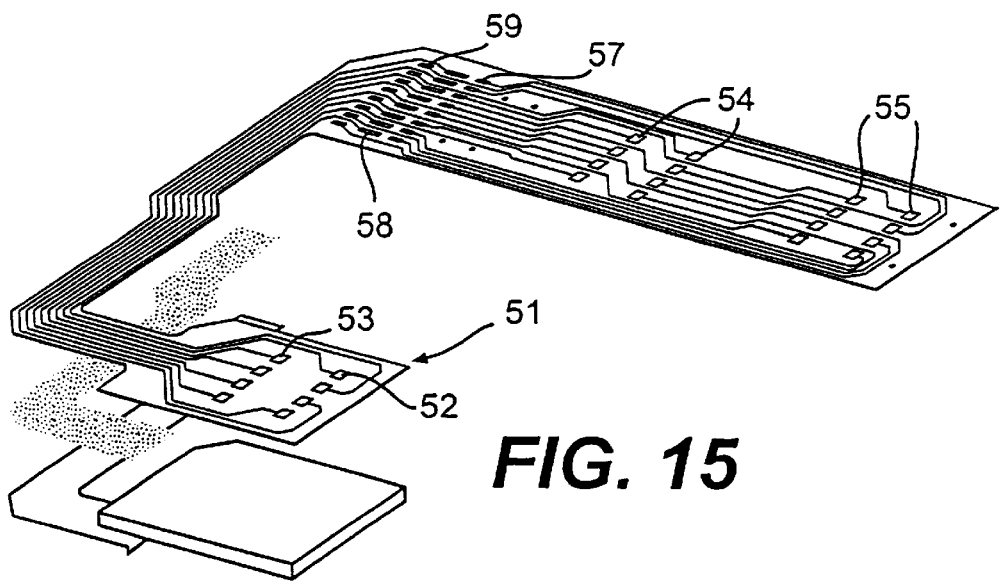
FIG. 15 is a perspective view of the arrangement as shown in FIG. 14 of the track.
Figure 16:
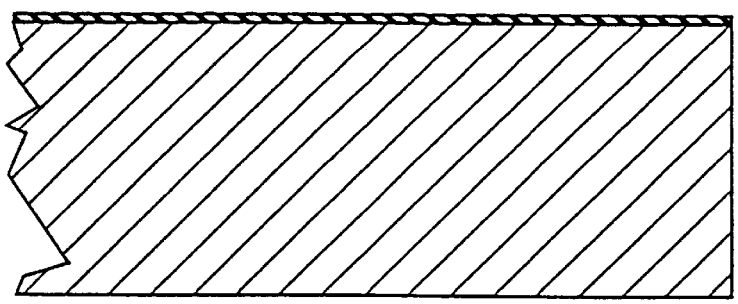
FIG. 16 is a cross sectional view along the lines of 16.

We now refer to FIGS. 14 and 15. These Figures show specifically a typical track comprised of the dual laminate of polyester plastics materials and the inlaid copper track.

There are at a take off location at 51 electrical contact points shown typically at 52 and 53 which are in turn, coated with an appropriate long lasting material such as gold or iridium and these are left open for electrical contact purposes.

At the switch, contact with respective Subscriber Identification Modules is achieved by folding over the track and accordingly the track itself has two sets of electrical contactors shown at 54 in the one case and 55 in the other. There are breaks in the circuit shown at 56 so that an electrical contactor can variously connect connections say to the take off connectors at 58 in the one case or the connecters at 59 for connection to the contactors at 58 in the other.

Figure 17:
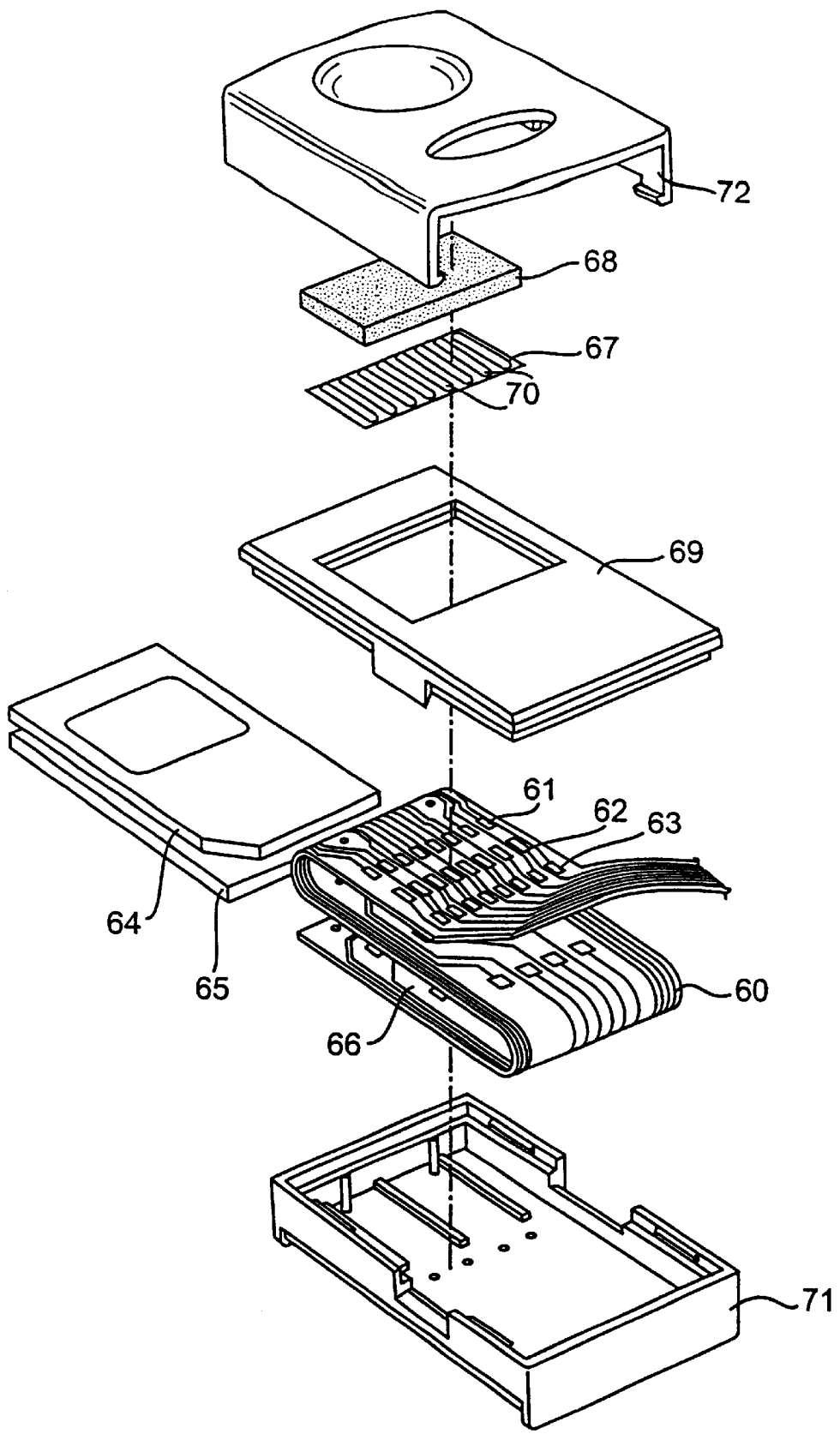
FIG. 17 is an exploded view of the components of switch means connecting to a flexible wire take off track.

The way this works is shown more generally at FIG. 17.

Accordingly, referring to FIG. 17, a track at 60 is folded over generally into an "S" shape so that upper most there are switch connectors at 61, 62 and 63, and such that two Subscriber Identification Modules at 64 and 65 will each fit in a slot shown at 66 so that both an upper and lower face of the two SIM cards will therefore present their electrically open contact surfaces.

An electrical contact plate at 67 is held under the pressure of a foam pad 68 within switch operative plate 69 and such that respective electrical connections will bridge either between the contacts of 61 and 62 in the one case or 62 and 63 in the other and thereby bring into active connection the module either 64 in the one case or 65 in the other.

Figure 18:
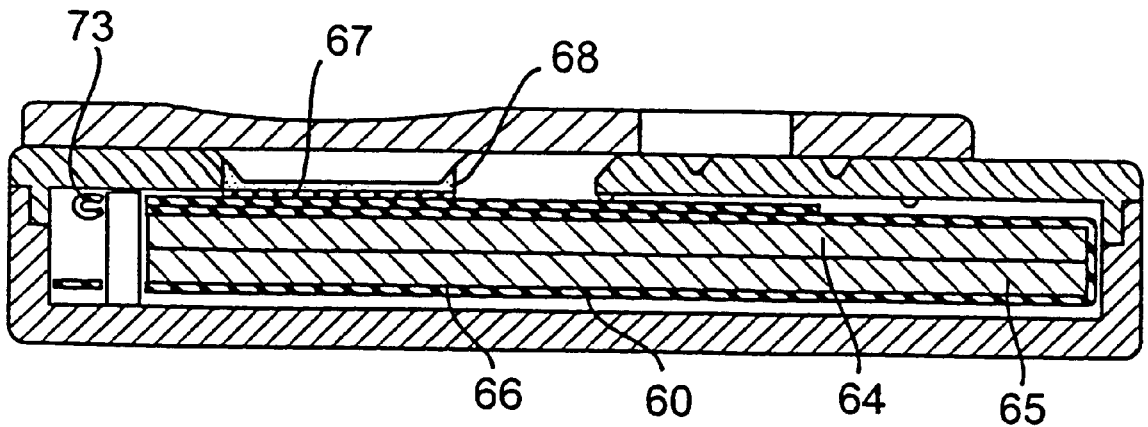
FIG. 18 is a cross sectional view of the assembled switch means as shown in FIG. 17 in the exploded view.
Figure 19:
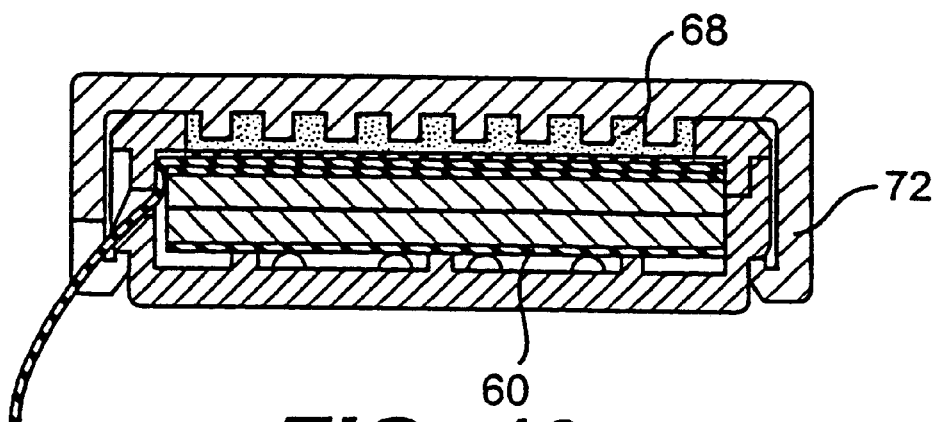
FIG. 19 is an opposite cross sectional view of the same switch as shown in FIG. 18.
Figure 20:
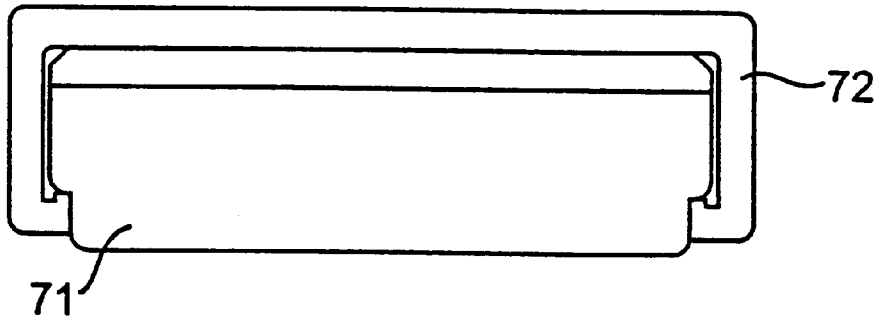
FIG. 20 is an end elevation of the switch as shown in FIGS. 18 and 19 and in the exploded view in 17.

There is a housing at 71 and a cover at 72 to hold all of these pieces together. When assembled, the switch has a cross sectional view as shown in FIGS. 18 and 19 from where it will be seen that the track 60 will be caused to bend tightly back on itself at 73 providing an uppermost surface by which the electrical connections at 67 can then effectively contact and bridge across the appropriate contact surfaces.

This then illustrates how the invention can be put into practice in various modes.

From the description, it will be seen that there can be provided in a very effective way to substantially all of the mobile digital phones that are known to exist means to significantly improve these for access by the user in respect of providing alternate providers at the whim of the user. Such a modification can be economically prepared and provided, and can be installed very simply by appropriate people. It will not provide any interference to conventional enjoyment or the size or location of any digital mobile phone currently available.

With conventionally engineered plastic covers there has been found to be ample gaps of sufficient size to slip electrical track there through and this enables connections to be made which do not rely in the slightest on any manufacturers approval because the inner electrical components are not prejudiced and warranties will therefor not be affected.

At the same time this gives significant advantage to a consumer who can then simply and cheaply expand functions of a phone both by reason of easy alternative SIM card access and other logic connections.

What is claimed is:

1. A digital mobile phone comprising at least two subscriber identification module cards, and switch means arranged so that a user can change the switch means from one switch position to another switch positions, thereby to select for electrical connection to the mobile phone, one or another of said module cards, each of said module cards permitting said phone to access a respective associated mobile telephone network as a function of the position of said switch means.

2. A digital mobile phone as set forth in claim 1, further including memory means provided in said phone, and further including a software program associated with said memory means and a central processing unit to effect, on a selected bases, switching of the switch to one or another of said module cards.

3. A digital mobile phone comprising an internal holder, a user-removable subscriber identification module card within the internal holder, said internal holder including a take-off card for replacing any subscriber identification module disposed therein, and connector means for making electrical connection of said subscriber identification module card to said phone, and a wire take-off for each subscriber identification module connection;

said wire take-off extending outside of the body of the mobile phone to an external subscriber identification module card holder, the external subscriber identification module card holder being adapted to hold at least two subscriber identification module cards each having electrical connections connected to the corresponding wire take-offs connected to said card take-off, and having a switch connected thereto to change connection of the wire take-offs from a first subscriber identification module card in the external card holder to another subscriber identification module card in the external card holder, each of said subscriber identification module cards permitting said phone to access a respective associated mobile telephone network as a function of a position of said switch.

4. A digital mobile phone as in claim 1 further comprising:
an external card holder, electronically accessible memory and programmed software in said memory to provide additional functions for the digital mobile phone, whereby, said program within the software in memory is adapted to examine a best accessible network connection to be used.

5. A digital mobile phone as set forth in claim 3, further including: an electronics switch operable by said software, whereby a network provider may be chosen on the basis of either cost or best signal.

6. An existing mobile digital phone comprising an external holder attachable to the mobile digital phone and adapted to receive at least two subscriber identification module cards;

switch means for providing access to any one of a plurality of subscriber identification module cards in said external holder; and means for connecting such received subscriber identification module card electrically to a subscriber identification module take-off adaptor located within an internal subscriber identification module card holder in the digital mobile phone, each of said module cards permitting said phone to access a respective associated mobile telephone network as a function of a position of said switch means.

7. A digital mobile phone having a user removable subscriber identification module card internal holder comprising:

a take-off card disposed within said subscriber identification module card holder for making electrical connection between said subscriber identification module card and said phone;

a wire take-off for each subscriber identification module connection, said wire take-off extending outside of the body of said phone to an external subscriber identification module card holder;

said external subscriber identification module card holder being adapted to hold at least two subscriber identification module cards, each being provided with electrical connectors for connection to corresponding wire take-offs connected to said wire take-off; and a switch connected to said wire take-offs to change connection of the wire take-offs from a first subscriber identification module card in the external card holder to another subscriber identification module card in the external card holder, each of said module cards permitting said phone to access a respective associated mobile telephone network as a function of a position of said switch.

8. A digital mobile phone comprising a user-removable subscriber identification module card holder and a take-off card having a wire take-off for each subscriber identification module connection within the holder;

said wire take-off adapted to extend outside of the body of said mobile phone to an external subscriber identification module card holder attached to the phone casing;

the external subscriber identification module card holder being adapted to hold at least two subscriber identification module cards, each having its electrical connections connected to corresponding wire take-offs connected to said wire take-off; and further including a switch connecting the wire take-offs from a first subscriber identification module card in the external card holder to another subscriber identification module card in the external card holder, each of said module cards permitting said phone to access a respective associated mobile telephone network as a function of a position of said switch.

9. A digital mobile phone comprising a user-removable subscriber identification module card internal holder, said internal subscriber identification module card holder including a take-off card having electrical contacts replicating a subscriber identification module card that would otherwise be mounted therein, and making electrical connection to said phone;

a wire take-off for each subscriber identification module connection, each such wire take-off extending outside of the body of said mobile phone to an external subscriber identification module card holder;

the external subscriber identification module card holder being adapted to hold at least two subscriber identification module cards, each having its electrical connections connected to the corresponding wire take-offs connected to said take-off card, and a switch connected to said take-off to change connection from one of the subscriber identification module cards in the external card holder to a second of the subscriber identification module cards in the external card holder, each of said module cards permitting said phone to access a respective associated mobile telephone network as a function of a position of said switch.

10. A digital mobile phone as in any one of the preceding claims 2 through 5, wherein said wire take offs together comprise an integrated flexible circuit board including a substrate, a laid conducting track for each circuit on the substrate, and an overlay coating.

11. A digital mobile phone as in claim 2, wherein said wire take-offs together comprise an integrated flexible circuit board, including a substrate comprised of polyester plastic material, a laid conducting track for each circuit on the substrate, and an overlay coating of polyester plastic material.

12. A digital mobile phone using a subscriber identification module comprising: an externally-attached holder for at least two subscriber identification modules, whereby either one or another of said modules can be selected by a switch to be electrically connected for use with said phone, each of said modules permitting said phone to access a respective associated mobile telephone network as a function of a position of said switch.

13. A digital mobile phone as in claim 12, further including: memory means within said phone and a software program in said memory means and a central processing unit to effect switching of said switch to one or another of said modules.

* * * * *